US006892535B2

(12) United States Patent
Kim

(10) Patent No.: US 6,892,535 B2
(45) Date of Patent: May 17, 2005

(54) HYDRAULIC CIRCUIT FOR BOOM CYLINDER COMBINATION HAVING FLOAT FUNCTION

(75) Inventor: Jin Wook Kim, Kyungsangnam-do (KR)

(73) Assignee: Volvo Construction Equipment Holding Sweden AB, Eskilstuna (SE)

(*) Notice: Subject to any disclaimer, the term of this patent is extended or adjusted under 35 U.S.C. 154(b) by 48 days.

(21) Appl. No.: 10/442,337

(22) Filed: May 21, 2003

(65) Prior Publication Data

US 2003/0230082 A1 Dec. 18, 2003

(30) Foreign Application Priority Data

Jun. 14, 2002 (KR) ................................ 10-2002-0033353
Aug. 19, 2002 (KR) ................................ 10-2002-0048930

(51) Int. Cl.[7] ................................ F16D 31/02
(52) U.S. Cl. ................................ 60/429; 91/436
(58) Field of Search ..................... 60/422, 429; 91/436, 91/440

(56) References Cited

U.S. PATENT DOCUMENTS 4,522,109 A 6/1985 Marchi et al.
5,791,226 A * 8/1998 Chung et al. ................. 91/436
5,890,303 A * 4/1999 Ishikawa et al. .............. 60/429
2003/0121184 A1 7/2003 Yoshino et al.

FOREIGN PATENT DOCUMENTS

EP 0 389 136 9/1990

* cited by examiner

*Primary Examiner*—Thomas E. Lazo
(74) *Attorney, Agent, or Firm*—Ladas & Parry LLP

(57) ABSTRACT

The present invention relates to a hydraulic circuit for a boom cylinder combination having a float function which is capable of implementing a leveling work in such a manner that a leveling work is performed by lowering a boom based on its self-weight without using an operation oil discharged from a hydraulic pump using an excavator during a leveling work which includes a first inner path which is formed in one side of the boom cylinder combining spool and connects a hydraulic pump and a boom cylinder large chamber in a switching mode, a second inner path which is formed in the other side of the boom cylinder combining spool and connects an operation oil from the hydraulic pump to a hydraulic tank in a switching mode, and a third inner path which is formed in the other side of the boom cylinder combining spool and combines the operation oils from the small chamber and large chamber of the boom cylinder in a switching mode and connects the same to the hydraulic tank.

8 Claims, 5 Drawing Sheets

HYDRAULIC CIRCUIT FOR BOOM CYLINDER COMBINATION HAVING FLOAT FUNCTION

BACKGROUND OF THE INVENTION

1. Field of the Invention

The present invention relates to a hydraulic circuit for a boom cylinder combination having a float function which is capable of implementing a leveling work in such a manner that a leveling work is performed by lowering a boom based on its self-weight without using an operation oil discharged from a hydraulic pump using an excavator during a leveling work, and in particular to a hydraulic circuit for a boom cylinder combination having a float function which is capable of implementing a leveling work in such a manner that a leveling work is performed by lowering a boom by its self weight by combining an operation oil of a head side and a rod side of a boom cylinder to a hydraulic tank without using an operation oil.

2. Description of the Background Art

As shown in FIG. 1, a caterpillar type excavator includes a lower running body A which runs when a running motor is driven, a upper rotation body D which is engaged rotatably in the lower running body A in a let and right direction and on which a driving room B is formed, a boom E which has an end rotatably engaged to the upper rotation body D and which is driven when a boom cylinder f is driven, an arm H which has one end rotatably fixed to the other end of the boom E and which is driven when an arm cylinder G is operated, and a bucket J which is fixed to the other end of the arm H rotatably based on a link movement and which is driven when the bucket cylinder I is driven.

Generally, when a leveling work is performed using an excavator, a floating function is adapted, so that a leveling work is effectively performed based on a curve surface in a work ground. In particular, without using an operation oil discharged from a hydraulic pump, an operation of a head side and a rod side of a boom cylinder is combined, and a boom is guided to be lowered by its self weight using a hydraulic pump for thereby implementing a leveling work. Therefore, the operation oil discharged from the hydraulic pump may be used for other work apparatuses, so that it is possible to save energy.

FIG. 2 is a cross sectional view illustrating a control valve for a boom cylinder combination having a float function in a conventional art.

As shown therein, the control valve for a boom cylinder combination in the conventional art includes a boom cylinder f which is connected with a hydraulic pump P and operates when an operation oil is supplied, a valve block c in which a spool is slidably installed for controlling a driving, stop and direction change of the boom cylinder and which is installed in a flow path between the hydraulic pump P and the boom cylinder f in such a manner that the valve block is switched when a pilot signal pressure Pi is applied, and a cap (a) which is engaged at one end of the valve block c and has a port into which a pilot signal pressure is applied for switching a spool d and has an elastic member b which is capable of returning the spool d to its initial position when a pilot signal pressure is released.

In the drawings, reference character "e" represents a high pressure path in which a high pressure oil is supplied from a hydraulic pump P to a small chamber g of the boom cylinder f through a flow path r, and p represents a low pressure path for guiding an operation oil from the large chamber I and the small chamber g of the boom cylinder to the hydraulic tank T through the flow path m, r.

Therefore, as shown in FIGS. 1 and 2, when the leveling work is performed in such a manner that the boom is lowered so that the bucket of the excavator contacts with the ground, as the operation lever which is provided for a leveling work is operated, the boom down pilot signal pressure Pi is supplied to the interior of the cap a formed in a right end of the valve block c, and the spool d installed in the valve block c is switched in the left direction, overcoming the elastic force of the elastic member b installed in the cap a, and a high pressure operation oil flows through the paths e, q, and r, in sequence, and is supplied to the small chamber g of the hydraulic cylinder f.

At this time, the operation oil in the side of the small chamber g of the boom cylinder is connected with the hydraulic tank T through the path r, the pockets I, j of the valve block c, and the low pressure path k, and the operation oil in the side of the large chamber I is connected with the hydraulic tank T through the pockets n, o formed in the path m and the valve block c and through the low pressure path k.

Therefore, in order to implement a leveling work, lowering the boom of the excavator, the operation oil discharged from the hydraulic pump P is used. In this state, the leveling work is performed by connecting the operation oil in the sides of the head and rod is connected to the hydraulic tank T. In this case, it is impossible to obtain an energy saving effect which is one of the major reasons when using the float during the leveling work. In addition, in the conventional art, since the valve bock having a float function is additionally provided with respect to the main control valve, the number of parts is increased, and the fabrication cost is increased.

SUMMARY OF THE INVENTION

Accordingly, it is an object of the present invention to provide a hydraulic circuit for a boom cylinder combination having a float function which is capable of saving energy by providing an operation oil discharged from a hydraulic pump to other actuators in such a manner that a boom is lowered by its self weight during a leveling work which is performed using an excavator.

It is another object of the present invention to provide a hydraulic circuit having a float function which is capable of implementing a float function by providing a float function to a spool of a boom cylinder combination of a main controller, so that since an additional part is not needed for a float function in the present invention, the number of parts is decreased, and a fabrication cost is decreased.

It is further another object of the present invention to provide a hydraulic circuit for a boom cylinder combination having a float function in which a spool of a boom cylinder combination is efficiently used by adding a float function to the other port of a boom cylinder combination in which only one port is used during the boom up operation.

To achieve the above objects, in a hydraulic circuit for a boom cylinder combining operation which includes a plurality of hydraulic pumps, a boom cylinder connected with a hydraulic pump, a boom cylinder combining spool which is installed in a flow path between the hydraulic pump and the boom cylinder for combining the operation oil from the hydraulic pumps in a switching mode, a boom cylinder driving spool which is installed in a flow path between the hydraulic pump and the boom cylinder and controls a driving, stop and direction change of the boom cylinder in a switching mode, and a remote control, valve which supplies a pilot signal pressure to the boom cylinder combining spool and the boom cylinder driving spool, there is provided a boom cylinder combining spool which includes a first inner path which is formed in one side of the boom cylinder combining spool and connects a hydraulic pump and a boom cylinder large chamber in a switching mode, a second inner path which is formed in the other side of the boom cylinder combining spool and connects an operation oil from the hydraulic pump to a hydraulic tank in a switching mode, and a third inner path which is formed in the other side of the boom cylinder combining spool and combines the operation oils from the small chamber and large chamber of the boom cylinder in a switching mode and connects the same to the hydraulic tank.

In addition, a solenoid valve is installed in a pilot path between the emote control valve and the boom cylinder combining spool and the boom cylinder driving spool and has a first state in which a pilot signal pressure is supplied to the boom cylinder driving spool when operating the remote control valve, and a second state which is switched when externally pressurized and in which a pilot signal pressure is supplied to the boom cylinder combining spool.

To achieve the above objects, in a boom cylinder combining hydraulic circuit which includes a plurality of hydraulic pumps, a boom cylinder connected with a hydraulic pump, a boom cylinder combining spool which is installed in a flow path between the hydraulic pump and the boom cylinder for combining the operation oil from the hydraulic pumps in a switching mode, there is provided a boom cylinder combining hydraulic circuit having a float function which includes a notch portion which is formed in an outer surface of one side of the boom cylinder combining spool and communicates the hydraulic pump and the large chamber of the boom cylinder in a switching mode of a boom cylinder combining spool, and a unit which is engaged to open and close an inner path in one side of the inner path longitudinally formed in a center of the boom cylinder combining spool and combines the operation oils of the large and small chambers of the boom cylinder as it is opened when the operation oil is flown in from the small chamber of the boom cylinder and connects the operation oils to the hydraulic tank, and when the operation oil is flown in the other side of the inner path from the hydraulic pump, one side of he inner path is closed.

In addition, an opening and closing unit is a poppet type check valve which opens one side of the inner path when a back pressure chamber of one side of the inner path communicates with a hydraulic tank in a switching mode of a boom cylinder combining spool so that the boom cylinder is contracted and driven and closes the inner path so that the operation oil flowing into the inner path from the hydraulic pump when the boom cylinder is expanded and driven is prevented from being returned to the hydraulic tank.

An orifice is formed in a center of the poppet type check valve.

There is provided a first through hole which is radially formed to communicate with the notch portion in the outer side of the inner path and communicates the operation oil flowing from the small chamber of the boom cylinder into the inner path with a large chamber of he boom cylinder.

There is provided a second through hole which is radially formed in a boom cylinder combining spool to communicate with the back pressure chamber and communicates the back pressure chamber with the hydraulic tank when the operation oil is flown in the inner path from the small chamber of the boom cylinder in a switching mode of the boom cylinder combining spool and forms a negative pressure in the back pressure chamber when the operation oil is flown into the inner path from the large chamber of the boom cylinder.

To achieve the above objects, in a boom cylinder combining hydraulic circuit which includes a plurality of hydraulic pumps, a boom cylinder connected with a hydraulic pump, a boom cylinder combining spool which is installed in a flow path between the hydraulic pump and the boom cylinder for combining the operation oil from the hydraulic pumps in a switching mode, there is provided a boom cylinder combining hydraulic circuit having a float function which includes a first notch which is formed in an outer surface of one side of the boom cylinder combining spool and connects a small chamber of the boom cylinder to a hydraulic tank in a switching mode of a boom cylinder combining spool for lowering a boom, a second notch which is formed in an outer surface of the other side of the boom cylinder combining spool and connects a large chamber of the boom cylinder to the hydraulic tank in a switching mode of the boom cylinder combining spool for lowering the boom, and a third notch which is formed opposite to the second notch in an outer surface of the other side of the boom cylinder combining spool and communicates the hydraulic pump and the large chamber of the boom cylinder in a switching mode of the boom cylinder combining spool for moving up the boom.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The preferred embodiments of the present invention will be described with reference to the accompanying drawings.

Figure 1:
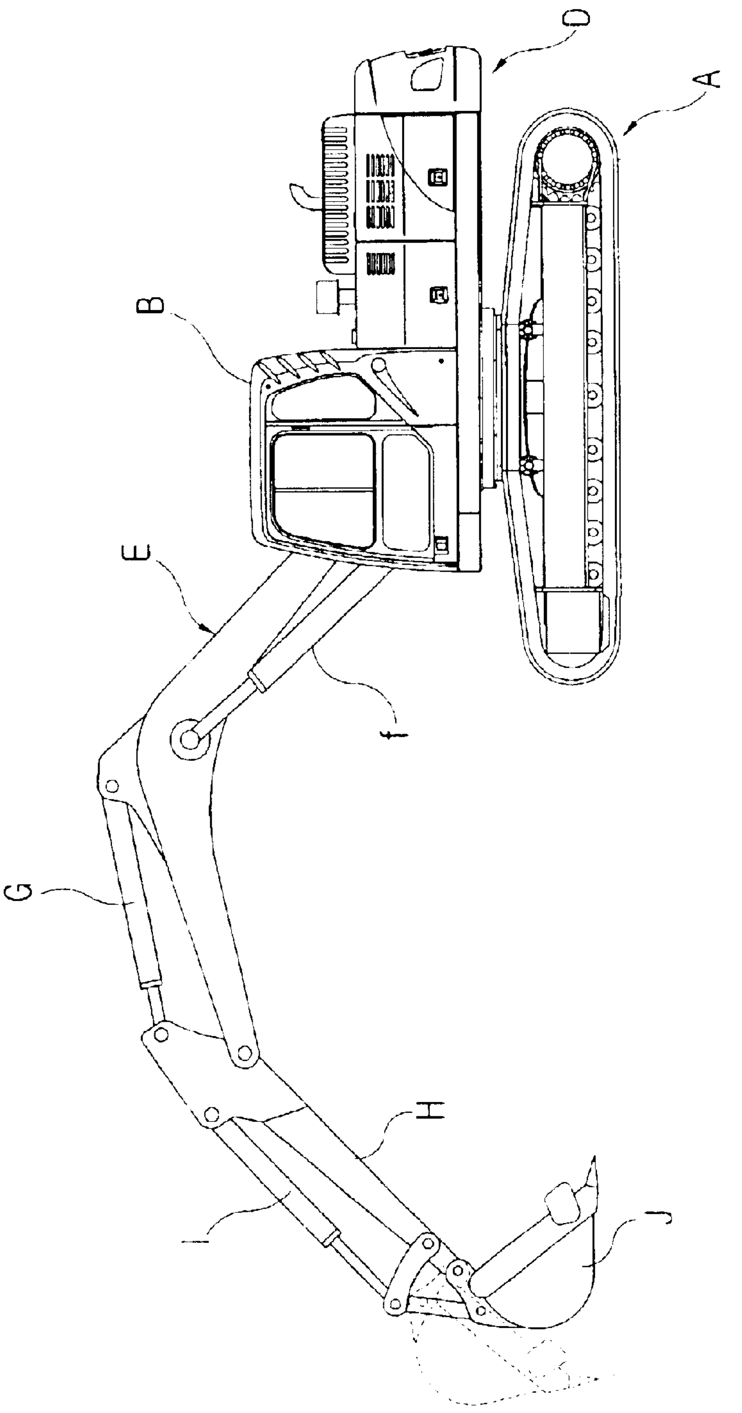
FIG. 1 is a schematic lateral view illustrating a conventional endless type excavator.
Figure 2:
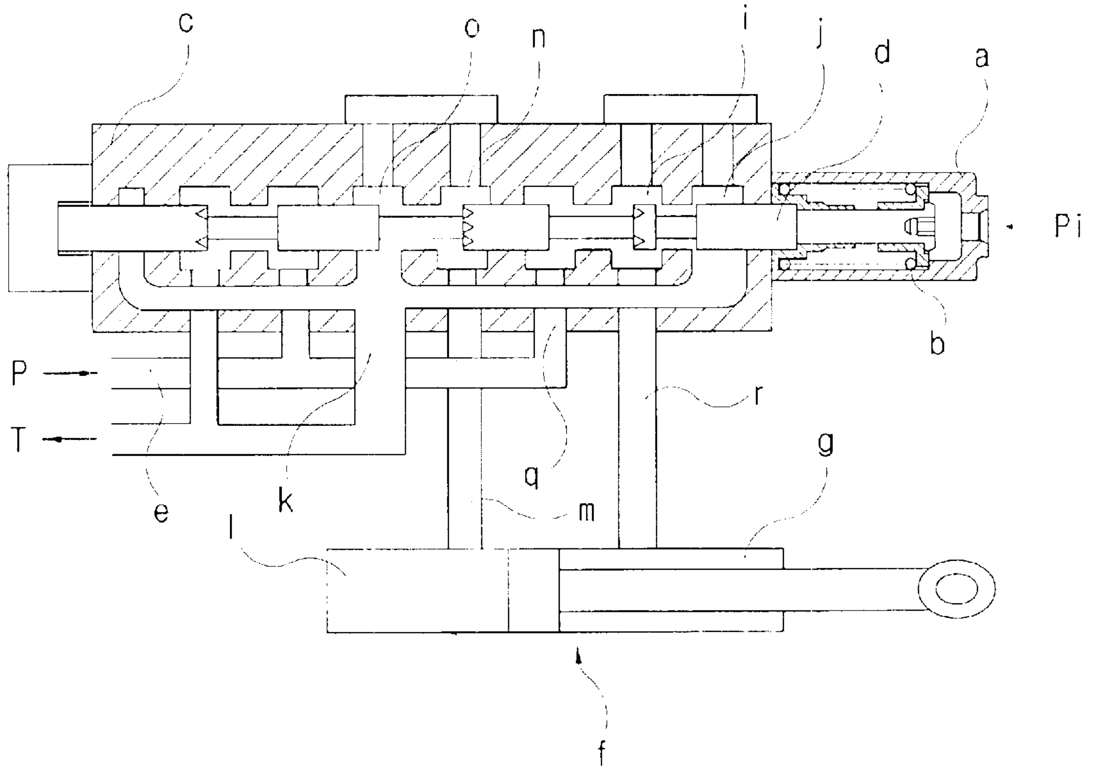
FIG. 2 is a cross sectional view illustrating a control valve having a float function in the conventional art.
Figure 3:
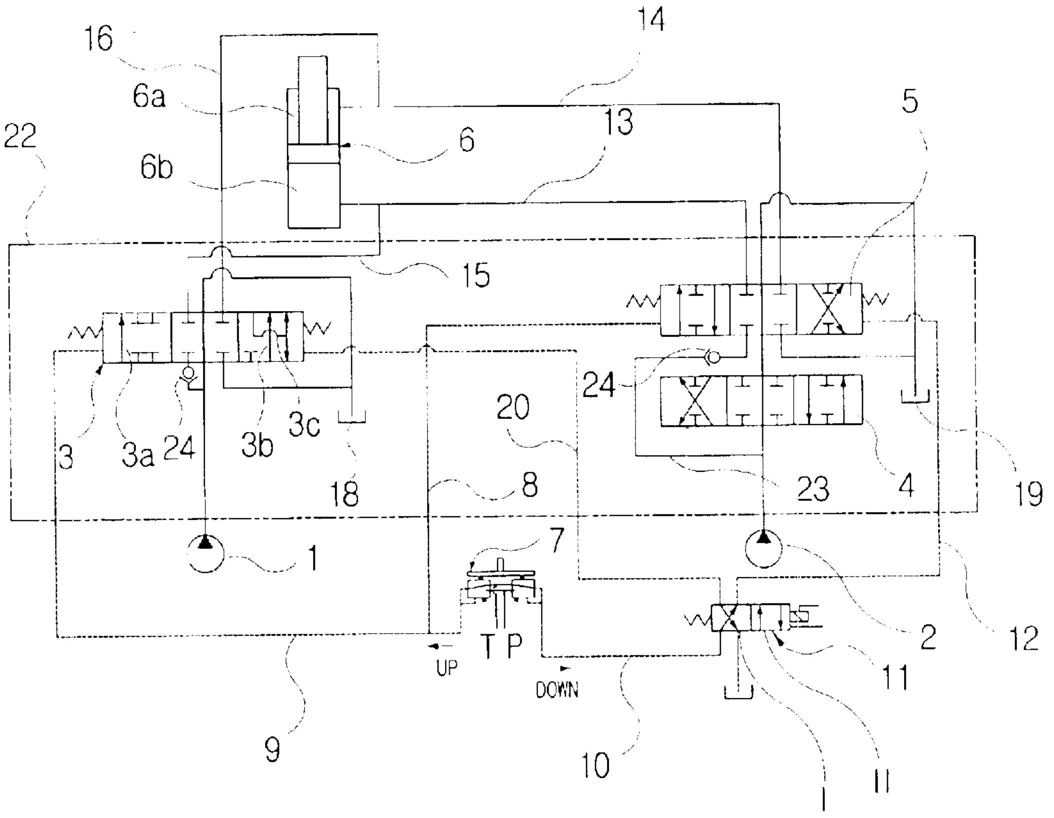
FIG. 3 is a view illustrating a hydraulic circuit for a boom cylinder combination having a float function according to an embodiment of the present invention.
Figure 4:
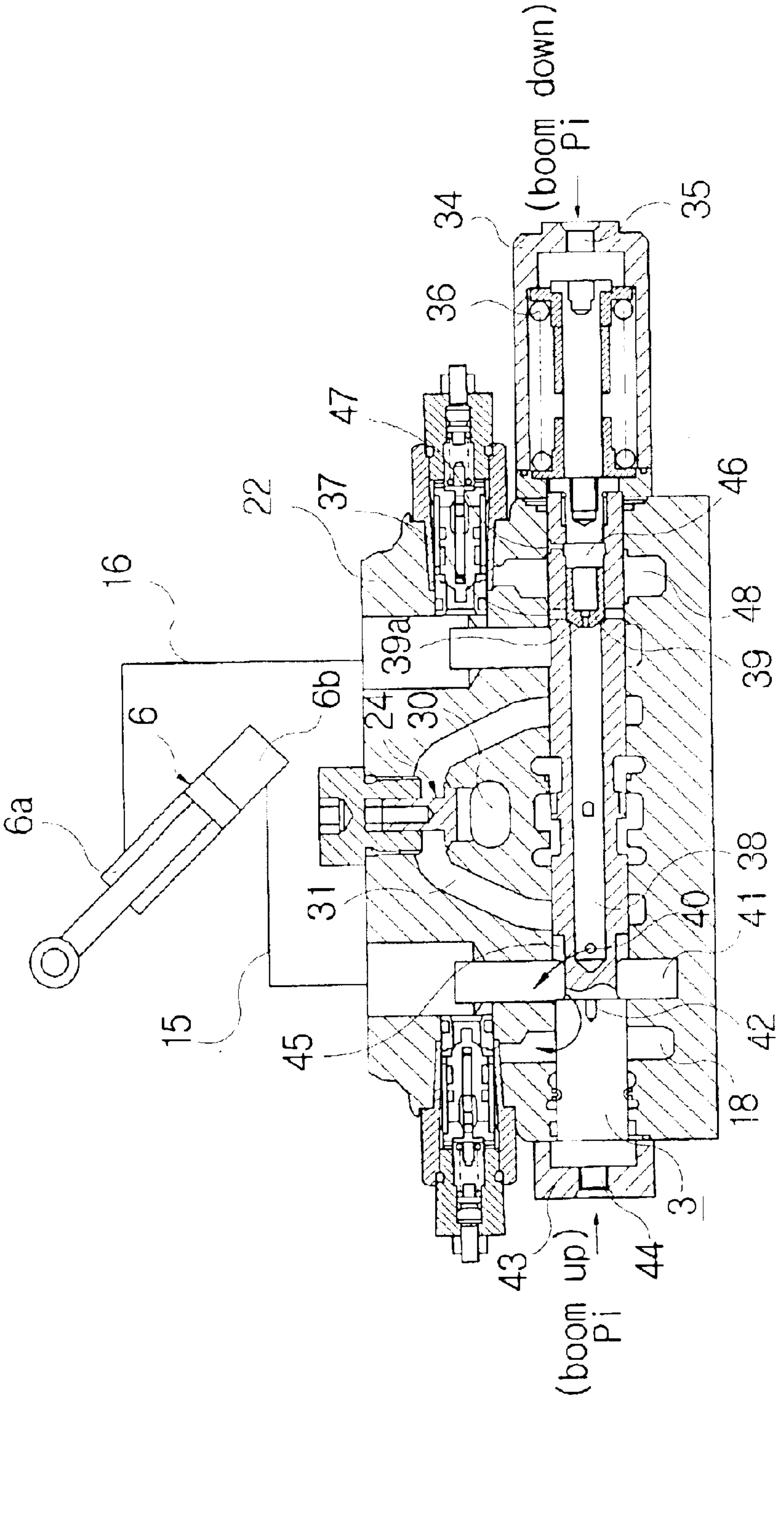
FIG. 4 is a cross sectional view illustrating a control valve for a boom cylinder combination having a float function according to an embodiment of the present invention.

As shown in FIGS. 3 and 4, the hydraulic circuit for a boom cylinder combination according to the present invention is adapted to a hydraulic circuit of a heavy equipment which includes more than at least two hydraulic pumps 1, 2, a hydraulic cylinder 6 (or called as a boom cylinder) which is connected with the hydraulic pumps 1, 2, a boom cylinder driving spool 5 which is adapted to control a driving, stop, and direction change of the boom cylinder 6, being installed in a flow path between the hydraulic pump 2 and the boom cylinder 6 and switched when a pilot signal pressure is applied, a boom cylinder spool 3 which is installed in a flow path between the hydraulic pump 1 and the boom cylinder 6 and is switched when a pilot signal pressure is applied based on an operation of the remote control valve 7, so that the operation oil of the hydraulic pump 1 is combined with an operation oil supplied to the large chamber 6*b* of the boom cylinder 6 from the hydraulic pump 2, and a remote control valve 7 which supplies a pilot signal between the boom cylinder combination spool 3 and the boom cylinder driving spool 5. Therefore, as shown in FIG. 3, the boom cylinder combination hydraulic circuit having a float function according to the present invention includes a first inner path 3*a* which is formed in one side of the boom cylinder combination spool 3 and connects the hydraulic pump 1 and the large chamber 6*b* of the boom cylinder 6, a second inner path 3*b* which is formed in the other side of the boom cylinder combination spool 3 and connects the operation oil from the hydraulic pump 1 to the hydraulic tank 18 during a switching operation, and a third inner path 3*c* which is formed in the other side of the boom cylinder combination spool 3 and combines the operation oils from the small chamber 6*a* and the large chamber 6*b* and connects to the hydraulic tank 18. At this time, a solenoid valve 11 having a first state I which supplies a pilot signal pressure to the boom cylinder driving spool 5 when driving the remote control valve 7 and a second state 11 which supplies a pilot signal pressure to the boom cylinder combination spool 3 based on a switching operation when pressurized from the outside is installed in the pilot path between the remote control valve 7, the boom cylinder combination spool 3 and the boom cylinder driving spool 5.

Figure 5:
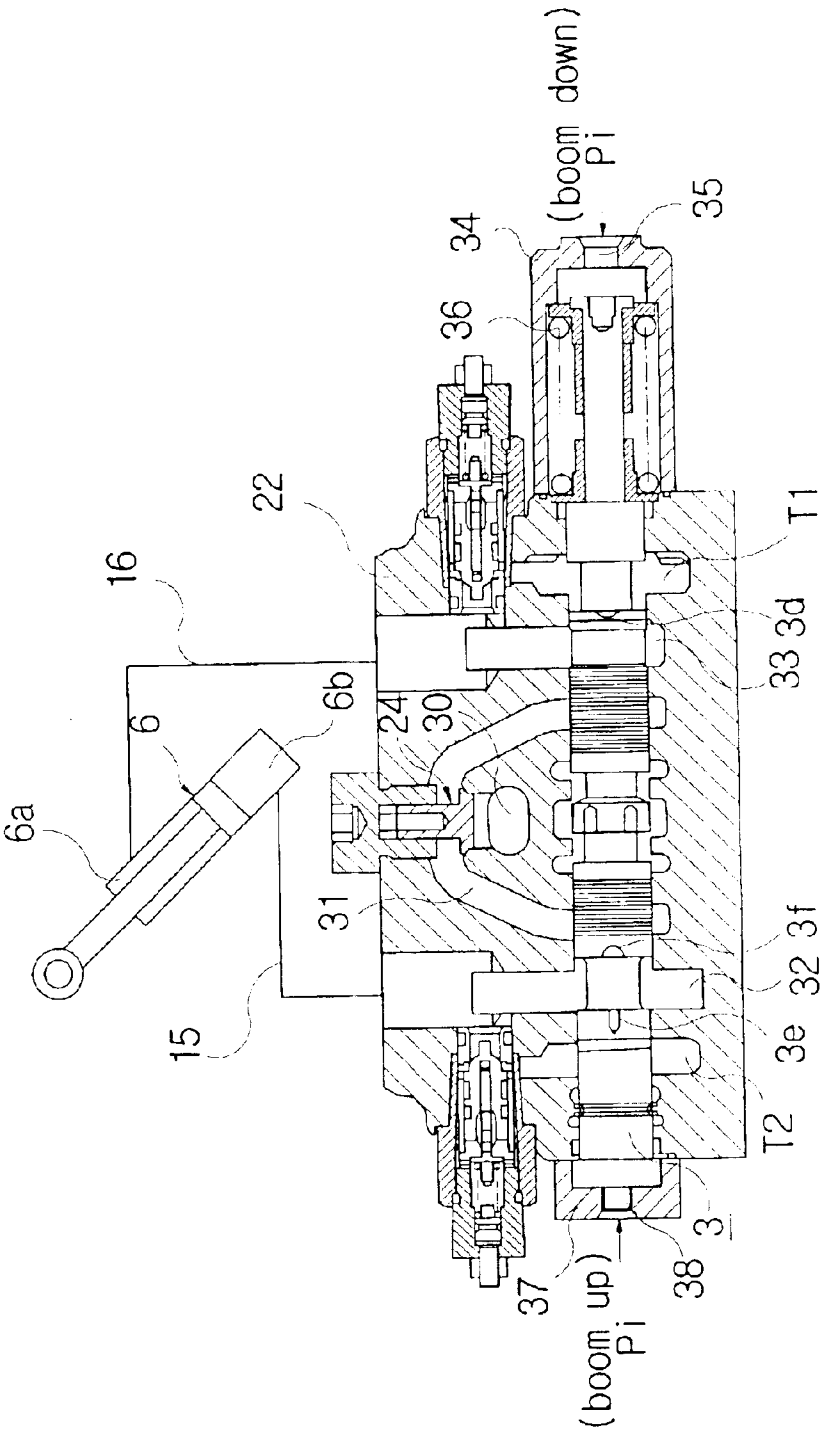
FIG. 5 is a cross sectional view illustrating a control valve for a boom cylinder combination having a float function according to another embodiment of the present invention.

As shown in FIG. 4, the boom cylinder combination control valve having a float function according to an embodiment of the present invention includes a notch portion 45 which is formed in one outer surface of the boom cylinder combination spool 3 and communicates the first hydraulic pump 1 and the one side chamber 6*b* (large chamber) of the boom cylinder 6 based on a switching operation of the boom cylinder combination spool 3 when a pilot signal pressure Pi is applied, and a unit which is engaged to open and close the inner path 38 in one side of the same longitudinally formed in the center of the boom cylinder combination spool 3 and is opened when an operation oil is flown from the other side chamber 6*a* (small chamber) of the boom cylinder 6 to the inner path 38 and combines the operation oils of the one side chamber 6*b* and the other side chamber 6*a* and connects to the hydraulic tank 18 and closes the one side of the inner path 38 when the operation oil is flown into the other side of the inner path 38. At this time, the opening and closing unit includes a poppet type check valve 39 which closes the inner path 38 so that a back pressure chamber 46 of one side of the inner path 38 opens one side of the inner path 38 when communicating with the hydraulic tank 48 based on a switching operation of the boom cylinder combining spool 3 in order for the boom cylinder 6 to be contracted and driven, and the operation oil flowing from the second hydraulic pump 2 into the inner path 38 is not returned into the hydraulic tank 48 when the boom cylinder 6 is expanded and driven. In addition, a first through hole 40 is formed in the other side of the inner path 38 to communicate with the notch portion 45 in a radial direction so hat the operation oil flowing from the small chamber 6*a* of the boom cylinder 6 when the boom is contracted is communicated with the large chamber 6*b* of the boom cylinder 6 through the notch portion 45. In addition, a second through hole 47 is formed in the boom cylinder combination spool 3 to communicate with the back pressure chamber 46 so that the back pressure chamber 46 communicates with the hydraulic tank 48 when the operation oil is flown from the small chamber 6*a* of the boom cylinder 6 into the inner path 38 when the boom is contracted based on a switching operation of the boom cylinder combination spool 3, and a negative pressure is formed in the back pressure chamber 46 when the operation oil is flown from the large chamber 6*b* of the boom cylinder 6 into the inner path 38 when the boom is expanded. In the drawings, reference numeral 4 represents a bucket cylinder driving spool installed in a discharging path of the hydraulic pump 2. In addition, as shown in FIGS. 3 and 5, the boom cylinder combination control valve according to another embodiment of the present invention is adapted to a hydraulic circuit of a heavy equipment which includes a plurality of hydraulic pumps 1, 2, a boom cylinder 6 connected with the hydraulic pump 2, and a boom cylinder combining spool 3 which is installed between the hydraulic pump 1 and the boom cylinder 1, 2 and combines an operation oil discharged from the hydraulic pumps 1, 2 and is supplied to the large chamber 6*b* when it is switched when a switching signal pressure is applied. Since the above construction is same as the first embodiment of the present invention, the detailed description thereof will be omitted. Here, the duplicated elements are given the same reference numerals. Therefore, the boom cylinder combining control valve having a float function according to another embodiment of the present invention includes a first notch 3*d* which is formed in an outer surface of the boom cylinder combining spool 3 and connects the small chamber 6*a* of the boom cylinder 6 to the hydraulic tank T1 when the boom cylinder combining spool 3 is switched for thereby lowering the boom, a second notch 3*e* which is formed in an outer surface of the other side of the boom cylinder combining spool 3 and connects the large chamber 6*b* of the boom cylinder 6 to the hydraulic tank T2 when the boom cylinder combining spool 3 is switched for hereby lowering the boom, and a third notch 3*f* which is formed in the outer surface of the other side of the boom cylinder combining spool 3 opposite to the second notch 3*e* and communicates the large chamber 6*b* of the boom cylinder 6 and the hydraulic pump 1 when the boom cylinder combining spool 3 is switched for thereby lifting the boom. The operation of the boom cylinder combing control valve having a float function according to the present invention will be described.

A) The procedure for lowering the boom for implementing a common work suing an excavator will be described with reference to FIG. 3. In the case that the lever of the remote control valve 7 is operated in the down direction by an operator, the boom down pilot signal Pi which passes trough the remote control valve 7 passes through the pilot path 10, the solenoid valve 11, and the pilot path 12 and is applied to a right end of the boom cylinder driving spool 5, so that the inner spool is switched in the left direction in the drawing. Therefore, the operation oil discharged from the second hydraulic pump 2 flows through the parallel path 23 and the check valve 24 and passes through the switched boom cylinder driving spool 5 and is supplied to the small chamber 6*a* of the boom cylinder 6 along the path 14. At this time, the path 16 between the small chamber 6*a* of the boom cylinder 6 and the boom cylinder combining spool 3 is blocked by the boom cylinder combining spool 3 which maintains an intermediate position, and the path 15 which connects the large chamber 6*b* of the boom cylinder 6 and the boom cylinder combining spool 3 is blocked by the boom cylinder combining spool 3 which maintains an intermediate position. Therefore, the operation oil from the large chamber 6*b* of the boom cylinder 6 returns to the hydraulic tank 19 through the path 13 between the large chamber 6*b* and the boom driving spool 5 and the boom cylinder driving spool 5, so that the boom of the excavator is slowly lowered. At this time, the boom cylinder combining spool 3 does not move and maintains an intermediate position, so that it is possible to lower the boom of the excavator based on the switching operation of the boom cylinder driving spool 5.

B) The procedure for lowering the boom based on a float function during the leveling work using the excavator will be described with reference to FIG. 3. In the case that the lever of the remote control valve 7 is operated in the direction of the boom down, a pressure switch (not shown) is operated and switches the position of the solenoid valve 11 in the left direction, so that the boom down pilot signal pressure Pi which passes through the remote control valve 7 is applied to a right end of the boom cylinder combining spool through the pilot path 10, the switched solenoid valve 11, and the pilot path 20, sequentially, so that the spool is switched in the left direction in the drawings.

Therefore, the operation oil discharged from the first hydraulic pump 1 is returned to the hydraulic tank 18 through the boom cylinder combining spool 3 which is switched, and the operation oil discharged from the second hydraulic pump 2 is returned to the hydraulic tank 19 through the bucket cylinder driving spool 4 which maintains an intermediate position and the boom cylinder driving spool 5. Therefore, the operation oils of the rod side and head side of the boom cylinder 6 are combined in the third inner path 3*c* in the interior of the boom cylinder spool 3 through the paths 16, 15 irrespective of the operation oil in the side of the first and second hydraulic pump 1, 2 and are returned to the hydraulic tank 18. Therefore, in the case that the flow function provided to the boom cylinder combining spool 3 is used for implementing a leveling work along the work surface having a protruded surface using the excavator, since the operation oil is not used, the operation oil discharged from the pump may be used for switching the bucket cylinder driving spool 4 or driving the bucket, or the operation oil may be applied to the actuator such as a swing motor. Therefore, when selecting the float function for performing a leveling work using the excavator, it is possible to save energy. The above float function is provided to one port of the boom cylinder combining spool 3 installed in the valve body 22 of the main control valve which is generally used during the boom down, so that an additional valve block for the float function is not needed, thereby decreasing the unit cost and fabrication cost.

C) The procedure for lowering the boom for implementing a leveling work suing an excavator will be described with reference to FIG. 4 which shows a cross section of the boom cylinder combining control valve. In the case that the level of the remote control valve 7 is operated in the direction of the boom down by an operator, the boom down pilot signal pressure Pi is supplied through the pilot signal pressure introducing portion 35 formed in the cap 34 formed in the right end of the valve body 22, the boom cylinder combining spool 3 is switched in the left direction, overcoming the elastic force of the elastic member 36 installed in the cap 34. At this time, the operation oil from the high pressure path 30 in the side of the second hydraulic pump 2 pushes up the check valve 24 and is supplied to the parallel path 31. At this time, the parallel path 31 is blocked by the boom cylinder combining spool 3 which is position-switched in the left direction. At this time, the operation oil in the side of the small chamber 6*a* of the boom cylinder 6 is supplied to the through hole 37 radially formed in the boom cylinder combining spool 3 which is position-switched and slidably formed in the valve body 22 through the path 16. The operation oil in the entrance of the through hole 37 pushes the poppet type check valve 39 engaged in an end of the inner path 38 longitudinally formed in the center of the boom cylinder spool 3 (at this time, since the send through hole 47 communicating with the back pressure chamber 46 of the poppet type check valve 39 communicates with the hydraulic tan 48, a low pressure is formed in the back pressure chamber) and is connected to the actuator pocket 41 formed in the valve body 22 through the first through hole 40 formed in the other end of the inner path 38. In addition, the operation oil in the side of the large chamber 6*b* of the boom cylinder 6 is transferred to the actuator pocket 41 through the path 15, and the operation oil in the rod side and head side of the boom cylinder 6 is combined at the actuator pocket 41 and is returned to the hydraulic tank 18 through the notch 42 of the boom cylinder combining spool 3. Therefore, the boom cylinder 6 is slowly lowered based on the variation amount of the notch 42 of the boom cylinder spool 3, so that the boom is lowered by its self weight in a state that no load is applied to the boom cylinder 6, for thereby implementing a leveling work. In addition, it is possible to implement a leveling work corresponding to the curved surfaces. Since the operation oil in the side of the hydraulic pump is not used, it is possible to save energy, and an additional valve block is not needed by providing a float function to the boom cylinder combining spool 3. Therefore, it is possible to decrease the unit cost and the fabrication cost.

C-1) The procedure for lowering the boom for performing a leveling work will be described with reference to FIG. 5 which shows a boom cylinder combining control valve according to another embodiment of the present invention will be described.

In the case that the level of the remote control valve 7 is operated in the direction of the boom down by the operator, the pilot signal pressure Pi is supplied trough the pilot signal introduction portion 35 formed in the cap 34 of the right end and position-switches the boom cylinder combining spool 3 in the left direction, overcoming the elastic force of the elastic member 36 installed in the cap 34. At this time, the operation oil from the high pressure path 30 in the side of the second hydraulic pump 2 pushes up the check valve 24 and is supplied to the parallel path 31, the parallel path 31 is blocked by the boom cylinder combining spool 3 which is position-switched in the left direction. At this time, the operation oil in the side of the small chamber 6*a* of the boom cylinder 6 is transferred to the actuator pocket 33 formed in the valve body 22 and is moved to the hydraulic tank TY1 by the notch 3*d* of the boom cylinder combining spool 3. The operation oil in the side of the large chamber 6*b* of the boom cylinder 6 is transferred to the actuator pocket 32 through the path 15, and is moved to the tank T2 by the notch 3*e* of the boom cylinder combining spool 3. The operation oils in the rod side and head side of the boom cylinder 6 are returned to the hydraulic tanks T1, T2 through the notches 3*d*, 3*e* of the boom cylinder combining spool 3.

Therefore, since the boom cylinder 6 is slowly lowered base on the variation degree of the notches 3*d*, 3*e* of the boom cylinder combining spool 3, it is not needed to use the operation oil in the side of the hydraulic pump 1, 2, so that it is possible to implement a leveling work by lowering the boom based on its self weight.

In addition, it is possible to implement a leveling work in protruded grounds. So, it is possible to save energy without using an operation pressure in the side of he hydraulic pump and to decrease a cost by providing a float function to the conventional boom cylinder combining spool 3.

D) The procedure of the boom combining which is an inherent function of the boom cylinder combining valve will be described with reference to FIG. 3.

In the case that the level of the remote control valve 7 is operated in the direction of the boom up, the pilot signal pressure Pi which passes through the remote control valve 7 passes through the pilot path 9 is applied to the left end of the boom cylinder combining spool 3 for thereby position-switching the spool in the right direction.

At this time, a high pressure operation oil from the first hydraulic pump 1 is supplied to the large chamber 6*b* of the boom cylinder 6 through the check valve 24, the first inner path 3*a* of the switched boom cylinder combining spool, and the path 15, and the pilot signal pressure Pi which passes trough the pilot path 8 is supplied to the left end of the boom cylinder driving spool 5, so that the inner spool is position-switched in the right direction.

Therefore, the high pressure operation oil from the second hydraulic pump 2 is supplied to the large chamber 6*b* of the boom cylinder 6 through the parallel path 23, the check valve 24, and the inner path of the switched boom cylinder driving spool 5, so that the boom is moved up together with the operation oil from the fist hydraulic pump 1.

E) The procedure of the boom combining which is an inherent function of the boom cylinder combining valve will be described with reference to FIG. 4 which shows a boom cylinder combining control valve according to the present invention.

In the case that the level of the remote control valve 7 is operated in the boom up direction by an operator, the pilot signal pressure Pi is supplied through the pilot signal pressure input port 44 formed in the cap 43 engaged at the left end of the valve body 22 and position-switches the boom cylinder combining spool 3 in the right direction, overcoming he elastic force of the elastic member 36 installed in the cap 34 in the right end. At this time, the operation oil from the high pressure path 30 in the side of the first hydraulic pump 1 pushes up the check valve 24 and is moved to the actuator pocket 41 through the notch 45 of the boom cylinder combining spool 3 through the parallel path 31, and the operation oil of the actuator pocket 41 is supplied to the large chamber 6*b* of the boom cylinder 6, for thereby moving up the boom. At this time, the operation oil of the parallel path 41 is supplied to the inner path 38 of the boom cylinder combining spool 3 through the through hole 40, and is supplied to the back pressure chamber 46 behind the poppet type check valve 39 through the orifice 39*a* of the poppet type check valve 39.

Since the through hole 47 which is punched in the radial direction in the boom cylinder combining spool 3 to communicate with the back pressure chamber 46 is closed, the poppet type check valve 39 is seated in the left direction due to the difference of the cross section, so that it is possible to prevent the operation oil in the interior of the inner path 38 from being returned to the hydraulic tank 48.

When moving up the boom, the operation oil is combined using he one side path 15 of the boom cylinder combining spool 3, and when moving down using the float function, the large chamber 6*b* and the small chamber 6*a* are connected with the hydraulic tank 18 by the inner path 38, the first through hole 40 and the poppet type check valve 39 formed in the interior of the boom cylinder combining spool 3. In addition, the amount of flow is controlled by the notches 42 formed in the boom cylinder combining spool 3, so that no load occurs in the boom cylinder 6, for thereby lowering the boom by its self weight.

It is possible to prevent the loss of he energy without using an operation oil from the first and second hydraulic pumps 1, 2 and to implement a leveling work in protruded surfaces.

E-1) The procedure of the boom combining will be described with reference to FIG. 5.

In the case that the level of the remote control valve 7 is operated in the boom up direction by an operator, as the pilot signal pressure Pi is supplied through the pilot signal pressure inlet port 38 firmed in the cap 37 engaged to the left end of the valve body 22, and the boom cylinder combining spool 3 is position-switched in the right direction, overcoming the elastic force of the elastic member 36 installed in the cap 34 engaged to the right end.

At this time, the operation oil from the high pressure path 30 of the first hydraulic pump 1 moves up the check valve 24 and is moved to the actuator pocket 32 through the parallel path 31 and the third notch 3*f* of the boom cylinder combining spool 3, and the operation oil of the actuator pocket 32 is supplied to the large chamber 6*b* of the boom cylinder 6 through the path 15 for thereby moving up the boom.

When moving up the boom, the operation oils are combined using he pilot path 9 in one side of the boom cylinder combining spool 3 and the actuator pocket 32, and when moving down the boom using the float function, the large chamber 6*b* and the small chamber 6*a* of the boom cylinder 6 are connected with the hydraulic tanks T1, T2 by forming the first and second notches 3*d*, 3*e* connected to the actuator pockets 32, 33 in the interior of the boom cylinder combining spool 3, so that the flowing amount is controlled by the first and second notches 3*d*, 3*e* formed in the boom cylinder combining spool 3, whereby it is possible to move down the boom by the self weight without generating load in the boom cylinder 6.

Therefore, it is possible to implement a leveling work for protruded surfaces without loss of energy.

The hydraulic circuit for a boom combining having a float function has the following advantages.

It is possible to save an energy by providing an operation oil from a hydraulic pump to other actuator by performing a leveling work, lowering the boom by its self weight, without using an operation oil in the side of the hydraulic pump when performing a leveling work.

In addition, it is possible to decrease the unit cost and fabrication cost by decreasing the number of parts because an additional block is not needed for a float function by providing a float function to a boom cylinder combining spool which is used when moving up the boom.

Furthermore, it is possible to efficiently using a boom cylinder combining spool by providing a float function to other side port of the boom cylinder combining spool in which only one side port is used for moving up the boom.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a hydraulic circuit for a boom cylinder combining operation which includes a plurality of hydraulic pumps, a boom cylinder connected with a hydraulic pump, a boom cylinder combining spool which is installed in a flow path between the hydraulic pump and the boom cylinder for combining the operation oil from the hydraulic pumps in a switching mode, a boom cylinder driving spool which is installed in a flow path between the hydraulic pump and the boom cylinder and controls a driving, stop and direction change of the boom cylinder in a switching mode, and a remote control, valve which supplies a pilot signal pressure to the boom cylinder combining spool and the boom cylinder driving spool, said boom cylinder combining spool, comprising:

a first inner path which is formed in one side of the boom cylinder combining spool and connects a hydraulic pump and a boom cylinder large chamber in a switching mode;

a second inner path which is formed in the other side of the boom cylinder combining spool and connects an operation oil from the hydraulic pump to a hydraulic tank in a switching mode; and a third inner path which is formed in the other side of the boom cylinder combining spool and combines the operation oils from the small chamber and large chamber of the boom cylinder in a switching mode and connects the same to the hydraulic tank.

2. The circuit of claim 1, wherein a solenoid valve is installed in a pilot path between remote control valve and the boom cylinder combining spool and the boom cylinder driving spool and has a first state in which a pilot signal pressure is supplied to the boom cylinder driving spool when operating the remote control valve, and a second state which is switched when externally pressurized and in which a pilot signal pressure is supplied to the boom cylinder combining spool.

3. In a boom cylinder combining hydraulic circuit which includes a plurality of hydraulic pumps, a boom cylinder connected with a hydraulic pump, a boom cylinder combining spool which is installed in a flow path between the hydraulic pump and the boom cylinder for combining the operation oil from the hydraulic pumps in a switching mode, a boom cylinder combining hydraulic circuit having a float function, comprising:

a notch portion which is formed in an outer surface of one side of the boom cylinder combining spool and communicates the hydraulic pump and the large chamber of the boom cylinder in a switching mode of a boom cylinder combining spool; and means which is engaged to open and close an inner path in one side of the inner path longitudinally formed in a center of the boom cylinder combining spool and combines the operation oils of the large and small chambers of the boom cylinder as it is opened when the operation oil is flown in from the small chamber of the boom cylinder and connects the operation oils to the hydraulic tank, and when the operation oil is flown in the other side of the inner path from the hydraulic pump, one side of he inner path is closed.

4. The circuit of claim 3, wherein said opening and closing means is a poppet type check valve which opens one side of the inner path when a back pressure chamber of one side of the inner path communicates with a hydraulic tank in a switching mode of a boom cylinder combining spool so that the boom cylinder is contracted and driven and closes the inner path so that the operation oil flowing into the inner path from the hydraulic pump when the boom cylinder is expanded and driven is prevented from being returned to the hydraulic tank.

5. The circuit of claim 4, wherein an orifice is formed in a center of the poppet type check valve.

6. The circuit of claim 3, wherein there is provided a first through hole which is radially formed to communicate with the notch portion in the outer side of the inner path and communicates the operation oil flowing from the small chamber of the boom cylinder into the inner path with a large chamber of he boom cylinder.

7. The circuit of claim 3, wherein there is provided a second through hole which is radially formed in a boom cylinder combining spool to communicate with the back pressure chamber and communicates the back pressure chamber with the hydraulic tank when the operation oil is flown in the inner path from the small chamber of the boom cylinder in a switching mode of the boom cylinder combining spool and forms a negative pressure in the back pressure chamber when the operation oil is flown into the inner path from the large chamber of the boom cylinder.

8. In a boom cylinder combining hydraulic circuit which includes a plurality of hydraulic pumps, a boom cylinder connected with a hydraulic pump, a boom cylinder combining spool which is installed in a flow path between the hydraulic pump and the boom cylinder for combining the operation oil from the hydraulic pumps in a switching mode, a boom cylinder combining hydraulic circuit having a float function, comprising:

a first notch which is formed in an outer surface of one side of the boom cylinder combining spool and connects a small chamber of the boom cylinder to a hydraulic tank in a switching mode of a boom cylinder combining spool for lowering a boom;

a second notch which is formed in an outer surface of the other side of the boom cylinder combining spool and connects a large chamber of the boom cylinder to the hydraulic tank in a switching mode of the boom cylinder combining spool for lowering he boom; and a third notch which is formed opposite to the second notch in an outer surface of the other side of the boom cylinder combining spool and communicates the hydraulic pump and the large chamber of the boom cylinder in a switching mode of the boom cylinder combining spool for moving up the boom.

* * * * *